(12) United States Patent
Kranz et al.

(10) Patent No.: US 9,502,964 B2
(45) Date of Patent: Nov. 22, 2016

(54) SYSTEMS AND METHODS FOR SKEWING DC/DC CONVERTER PHASES TO MITIGATE SPURS

(71) Applicant: Intel Corporation, Santa Clara, CA (US)

(72) Inventors: Christian Kranz, Ratingen (DE); Stephan Henzler, Munich (DE); Carsten Eisenhut, Muelheim (DE)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 14/572,079

(22) Filed: Dec. 16, 2014

(65) Prior Publication Data
US 2016/0172966 A1    Jun. 16, 2016

(51) Int. Cl.
*G05F 1/20* (2006.01)
*H02M 3/04* (2006.01)
*H02M 1/14* (2006.01)
*H02M 3/158* (2006.01)

(52) U.S. Cl.
CPC ............ *H02M 3/04* (2013.01); *H02M 1/14* (2013.01); *H02M 3/158* (2013.01); *H02M 2003/1586* (2013.01)

(58) Field of Classification Search
CPC ............................................. H02M 2003/1586
USPC ................. 323/234, 246, 271, 282–285, 351
See application file for complete search history.

(56) References Cited

U.S. PATENT DOCUMENTS

| | | | | |
|---|---|---|---|---|
| 5,414,609 A | * | 5/1995 | Levran | H01F 27/2866 363/132 |
| 5,982,645 A | * | 11/1999 | Levran | H01F 27/2866 307/66 |
| 6,850,426 B2 | * | 2/2005 | Kojori | H02P 23/0036 363/123 |
| 7,791,324 B2 | * | 9/2010 | Mehas | H02M 3/1588 323/224 |
| 8,084,015 B2 | * | 12/2011 | Sokoll | A61K 39/0006 424/1.45 |
| 8,120,336 B2 | * | 2/2012 | Mehas | H02M 3/1588 323/224 |
| 8,829,871 B2 | | 9/2014 | Bayer | |
| 8,854,021 B2 | | 10/2014 | Saito et al. | |
| 2008/0080726 A1 | * | 4/2008 | Chen | H03F 3/2173 381/120 |
| 2011/0025284 A1 | * | 2/2011 | Xu | H02M 3/1584 323/282 |

* cited by examiner

*Primary Examiner* — Adolf Berhane
*Assistant Examiner* — Nusrat Quddus
(74) *Attorney, Agent, or Firm* — Eschweiler & Associates, LLC (57) ABSTRACT

A voltage converter system is disclosed. The system has a control unit, a multiphase converter, and a measuring unit. The control unit is configured to generate one or more converter parameter adjustments from a feedback signal. The multiphase converter is configured to selectively generate an output signal at a selected voltage and to adjust one or more converter parameters using the one or more converter parameter adjustments to mitigate generation of spurs in the output signal. The measuring unit is configured to measure the output signal and generate the feedback signal from the output signal.

18 Claims, 6 Drawing Sheets

SYSTEMS AND METHODS FOR SKEWING DC/DC CONVERTER PHASES TO MITIGATE SPURS

BACKGROUND

DC converters are used in a variety of systems, such as communication systems, to adjust voltage and phase levels. The DC/DC converter receives a DC input signal and converts it to a DC output having a selected voltage level, current level and phase.

The DC converters use a number of phases to generate the DC output and operate at a selected frequency. Unwanted noise, referred to as spurs, can be generated. This unwanted noise degrades the DC output from the selected values and can negatively impact operation of the system of which the DC converter is a part of.

What is needed are techniques to mitigate the unwanted noise from DC converters.

DETAILED DESCRIPTION

The systems and methods of this disclosure are described with reference to the attached drawing figures, wherein like reference numerals are used to refer to like elements throughout, and wherein the illustrated structures and devices are not necessarily drawn to scale.

Figure 1:
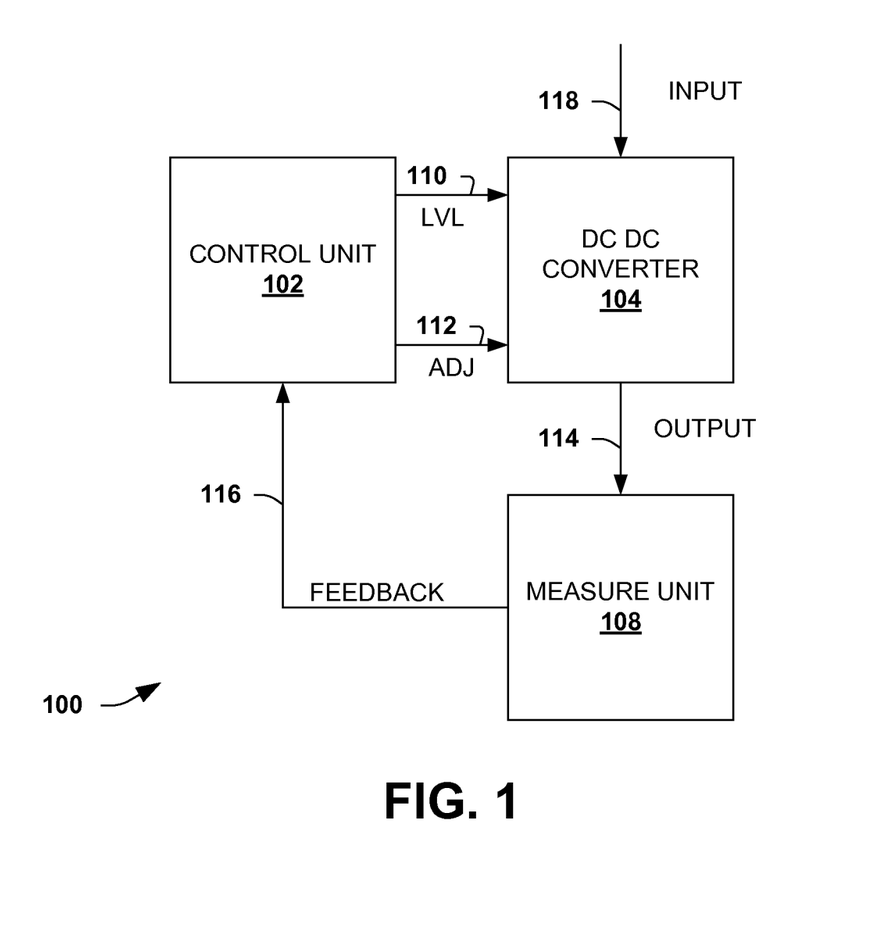
FIG. 1 is a diagram illustrating a system having a multiphase DC/DC converter that mitigates generation of spurs and other unwanted noise.

FIG. 1 is a diagram illustrating a system 100 having a multiphase DC/DC converter that mitigates generation of spurs and other unwanted noise. The system 100 is provided in a somewhat simplified format in order to facilitate understanding. It is appreciated that suitable variations are contemplated.

Multiphase DC/DC converters are often used as power supplies for transmitters, in particular power amplifiers within transmitters. The transmitter power amplifiers are sensitive to noise in their power supply. Any noise degrades generation of a signal for transmission and can result is data loss, reduced bandwidth, reduced receiver sensitivity, increased unwanted emissions and the like.

The multiphase DC/DC converters use a number of phases, such as four, to generate an output supply signal. Ideally, each phase operates identical to the others and there are no variations, referred to as mismatches. However, as described below, variations can occur. These variations or mismatches lead to generation of spurs and/or other unwanted noise.

The system 100 identifies and accounts for the mismatches of the phases and applies adjustments to components within the phases of the converter. As a result, the generation of spurs and/or other unwanted noise is mitigated.

The system 100 can be used in other systems, such as communication systems. For example, the system 100 can be used to supply power to a power amplifier of a transmitter or transceiver.

The system 100 includes a control unit 102, a DC/DC converter 104, and a measure or measuring unit 108. The control unit 102 receives feedback 116 and generates a DC level signal 110 and a parameter adjustment signal 112. The DC level signal 110 indicates a selected level for an output signal. The parameter adjustment signal 112 includes one or more parameter adjustments that mitigate generation of spurs and other noise. The control unit 102 generates the parameter adjustment signal 112 based at least partially on the feedback 116.

The control unit 102 can be implemented as circuitry, executable instructions and/or combinations thereof. In one example, the control unit 102 includes a processor and a memory unit, where the processor executes instructions from a memory in order to generate the signals 110 and 112.

Additionally, for simplicity, the control unit 102 is shown connected to the DC/DC converter 104. However, it is appreciated that the control unit 102 can be connected to components, such as adjustable inductors, within the DC/DC converter 104.

The measure unit 108 is configured to measure one or more properties of a DC output signal 114. The properties include voltage magnitude, phase, current magnitude, and the like. Typically, the properties are measured over time and can be time stamped. The measure unit 108 generates the feedback 116 based on these measurements. Thus, the feedback 116 can include some or all of the measured properties.

The measure unit 108 can be configured to measure the output signal 114 directly or indirectly. For example, the measure unit 108 can be configured to use a receiver chain (not shown) to indirectly measure the DC output signal 114 after it has been transmitted. In another example, the measure unit 108 directly measures the DC output signal 114.

The control unit 102 correlates the measured properties in order to determine the one or more parameter adjustments. For example, the control unit 102 could correlate a first fundament spur with inductor inductance values for each of the phases. As another example, the control unit could 102 could correlate the output signal and frequency to driver supply voltages for each of the phases.

The DC/DC converter 104 is a multiphase DC/DC converter in that multiple phases, each having drivers, individually generate phase output signals. The phase output signals are combined into a single output signal.

The converter 104 is configured to receive an input signal 118 and generate the output signal 114 at a selected level from the input signal 118. The input signal 118 can be at a fixed supply voltage and/or a time varying voltage. Additionally, the voltage of the input signal 118 is at a suitable value, such as, for example, at about 12 Volts or higher. The output signal 114 provides the output signal 114 with the selected value that can vary over time.

The DC/DC converter 104 is multiphase, thus there are a plurality of driver phases that have similar components. These components and functionality of these components can vary due to slight manufacturing variations, process variations, voltage variations, temperature variations, and the like. These variations, referred to as mismatches, can result in generation of spurs and/or other noise in the output signal 114. Spurs typically result from these types of variations and in spurs generated on multiples of a single phase switching frequency.

The converter 104 is configured to generate the output signal 114 with efficiency and stability. Additionally, the converter 104 is configured to mitigate the occurrence or amount of spurs in the output signal 114 by adjusting one or more parameters based on the parameter adjustment signal 112.

The adjustment(s) of these parameters at least partially mitigates for the mismatches in driver phases of the converter 104. The mismatches can occur due to process, voltage, and temperature (PVT) variations in components of the various phases. The adjustments include, for example, supply voltage adjustment, inductor adjustment, switching frequency adjustment, pulse width adjustment, cross over timing adjustment, and the like. The adjustments are for one or more of the phases and are typically specific to a phase. The mitigation of the mismatches in the converter 104 results in mitigation of spurs and the like in the output 114 of the converter 104.

Figure 2:
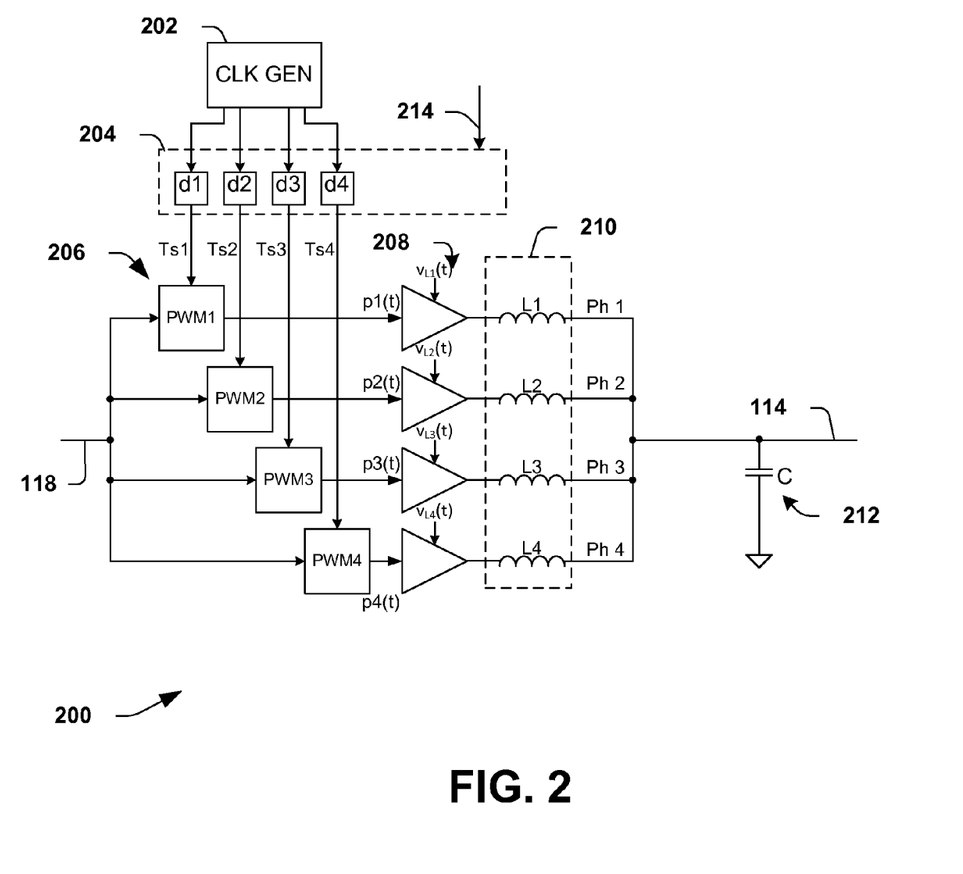
FIG. 2 is a diagram illustrating an example four phase DC/DC converter.

FIG. 2 is a diagram illustrating an example four phase DC to DC converter 200. The converter 200 includes four drivers for four phases, however it is appreciated that other converters using varied numbers of drivers and/or phases can also be used. One or more of the components are adjustable to account for mismatches between the drivers and to mitigate generation of spurs. The converter 200 can, for example, be used as the DC DC converter 104 in the system 100.

The converter 200 includes a clock generator 202, configurable delays 204, pulse width modulation (PWM) components 206, drivers 208, inductors 210, and an output capacitor 212. The converter receives an input signal 118 and generates an output signal 114 at a selected level. The output signal 114 can vary over time.

The clock generator 202 generates for successive clock signals shifted from a previous clock signal by 90 degrees. Thus, one clock signal is generated per phase. The clock generator 202 can also be configured to alter individual frequencies for each clock in order to mitigate spur generation.

The configurable delays 204 are coupled to the clock generator 202 and can be configured to adjust a delay for each phase. The delays 204 include a first delay d1, a second delay d2, a third delay d3 and a fourth delay d4. A configurable delay control signal 214 can be coupled to the delays and used to configure the delay for each phase. The delay control signal 214 can be part of or included with the parameter adjustment signal 112, described above.

In one example, the configurable delays 204 are adjusted using cross over timings. A phase pair is identified and analyzed to determine timing error or phase shift between the phase pair. The configurable delays 204 are then adjusted to mitigate the timing errors and spur generation.

The PWM components 206 receive the input signal 118 and generate pulse width modulated signals for each phase according to the clock signals from the clock generator 202. The PWM components 206 use a pulse width period, designated as Ts1, Ts2, Ts3 and Ts4 in this example. The pulse width periods can be identical for each phase and/or can be varied. In this example, there are four PWM components, one for each phase, designated as PWM1, PWM2, PWM3 and PWM4. Each generated modulated signal has a pulse width denoted by p1($t$), p2($t$), p3($t$), or p4($t$).

The pulse width components 206 are configured to adjust their respective pulse widths. In one example, a relationship between generated spurs and pulse width is determined. Then, during operation of the converter 200, the pulse widths are adjusted to mitigate spur generation.

The phase drivers 208 are configured to receive the generated modulated signals and amplify or drive the received signals to driver output signals according to a driver supply voltage. Each driver is shown having a configurable driver supply voltage designated as $V_{L1}$, $V_{L2}$, $V_{L3}$ and $V_{L4}$. The driver supply voltages can, for example, be configured according to the parameter adjustment signal 112. In one example, the parameter adjustment signal 112 includes adjustable driver supply values, which are used to configure the driver supply voltages. Variations between the driver supply voltages typically result in the generation of the spurs. Thus, adjusting one or more of the driver supply voltages can mitigate generation of spurs and driver supply mismatch.

The driver supplies $V_{L1}$, $V_{L2}$, $V_{L3}$ and $V_{L4}$, as stated above, are configured to have adjustable values or voltages. A suitable mechanism is used to adjust the voltages. In one example, adjustable resistors are placed in-line with the driver supplies and are configured to modify the voltages. In another example, individual supply drivers are configured to be adjustable.

The driver output signals pass through the inductors 210, which are designated as L1, L2, L3 and L4, and are provided as phase output signals. The phase output signals are designated as Ph1, Ph2, Ph3, and Ph4 and combine together to generate the converter output signal 114. Ideally, the inductors 210 all have the same inductance. However, variations in the inductors 210 lead to mismatches and generation of spurs. It is noted that the output capacitor 212 is coupled to the outputs of the inductors and serves to filter the converter output signal 114.

The inductors 210 can be configured to have adjustable inductance values. The adjusted inductance values can mitigate inductor mismatches and generation of spurs.

The DC/DC converter 200 is provided for illustrative purposes and it is appreciated that suitable variations are contemplated. The converter 200 is shown having delay or pulse width adjustments for the delays 204, supply voltage adjustments for the drivers 208, inductor adjustments for the inductors 210, switching frequency adjustments for the clock generator 202 and cross over timing adjustment. It is appreciated that variations of the converter can include other adjustable parameters to mitigate generation of spurs and can omit one or more of the shown adjustable parameters.

Figure 3:
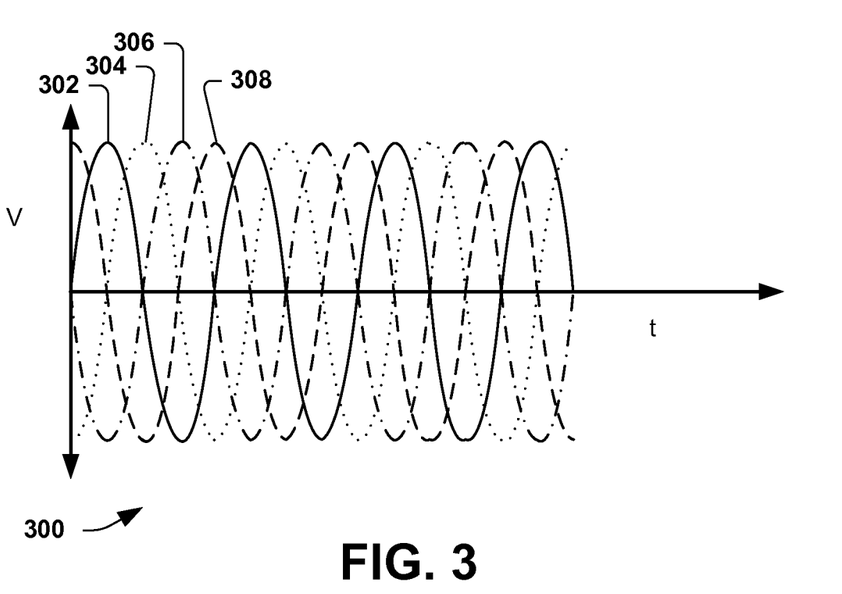
FIG. 3 is a graph depicting switching signals for four phases of a four phase DC/DC converter.

FIG. 3 is a graph 300 depicting a fundamental frequency of a switching signal for each of four phases of a four phase DC/DC converter. The graph 300 is provided for illustrative purposes and it is appreciated that variations in the signals shown can be used. For ease of understanding and explanation, FIGS. 1 and 2 will be referenced. The DC/DC converter discussed here can include the converters 104 and/or 200 described above.

The graph 300 includes time along an x-axis and volts along a y-axis. Switching/phase output signals are provided for four phases of the converter. The switching signals include a first phase/switching output signal 302, a second phase/switching signal 304, a third phase/switching signal 306 and a fourth phase/switching signal 308. The signals are 90 degrees offset as shown in FIG. 3. The converter 200, above, describes a technique to generate phase signals. The output signal of the converter is obtained by adding the phase output signals together.

It is noted that the first signal 302 and the third signal 306 are 180 degrees out of phase with each other. Similarly, the second signal 304 and the fourth signal 308 are also 180 degrees from each other. These phase pairs are, under ideal conditions, identical except for being 180 degrees out of phase with each other. As a result, the phase pairs cancel each other under ideal conditions. However, real world or non-ideal conditions typically result in some amount of non-cancelation.

A spur is generated as a result of the non-cancellation. The height of the remaining spur is a function of the driver supply voltage, inductance, switching frequency, pulse width and cross over timing. As an example, a spur height resulting from the first phase output signal 302 and the third phase output signal 306 is given by:

$$H_1 - H_3 = \frac{1}{L_1} v_{L1}(t) \frac{2T_{s1}}{(1-p_1(t))\pi^2} \times \sin((1-p_1(t))\pi) - \frac{1}{L_3} v_{L3}(t) \frac{2T_{s3}}{(1-p_3(t))\pi^2} \times \sin((1-p_3(t))\pi)$$

Where H1 is the amplitude of the first harmonic of phase 1, H3 is the amplitude of the first harmonic of phase 3, L1 is the inductor in phase 1, L3 is the inductor in phase 3, $V_{L1}$(t) is the driver supply of phase 1, $V_{L3}$(t) is the driver supply of phase 3, Ts1 is the switching frequency/period for phase 1, Ts3 is the switching frequency/period for phase 3, p1(t) is the pulse width of phase 1 and p3(t) is the pulse width of phase 3.

Figure 4:
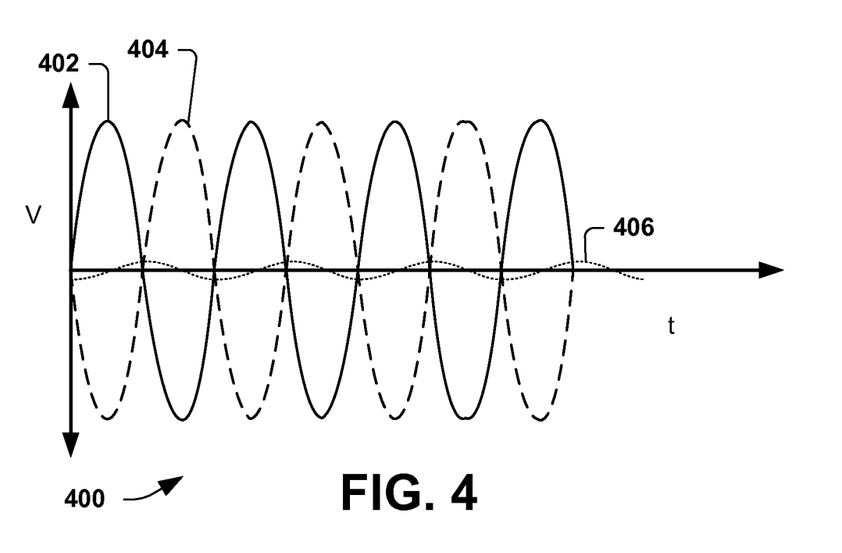
FIG. 4 is a graph illustrating cross over timing adjustment for a DC/DC converter.

FIG. 4 is a graph 400 illustrating cross over timing adjustment for a DC/DC converter. The graph 400 is provided for illustrative purposes and it is appreciated that variations in the signals shown can be used. FIGS. 1 and 2 and their description can also be referenced to facilitate understanding.

The graph 400 includes time along an x-axis and volts along a y-axis. Switching/phase output signals for a phase pair of the converter are shown. In this example, a first phase output signal 402 and a third phase output signal 406 are shown. The phase pair is 180 degrees out of phase and, under ideal conditions, cancel each other out.

Mismatches and non-idea condition present in the converter phases result in generation of spurs. However, timing error(s) can be used to generate an error signal 406 that is about 90 degrees/270 degrees phase shifted with the first phase output signal. Thus, the error signal 406 is nearly phase aligned with the generated spur. As a result, the error signal 406 can be used to mitigate the generated spur from mismatches between the phase pair.

A spur height of the timing error can be calculated as:

$$s(t)=\sin(2\pi f_s t)(1-\cos(d\phi))\pm\cos(2\pi f_s t)\sin(d\phi)$$

Where dφ is the timing error and the spur height follows the −cos(dφ) function for small timing errors and, therefore matches the desired phase shift.

Frequency timing shifts can be introduced into the clock signals generated, such as the signals generated by clock generator 202 described above. The delay adjusting elements 204 can be used to implement the adjustments.

Figure 5:
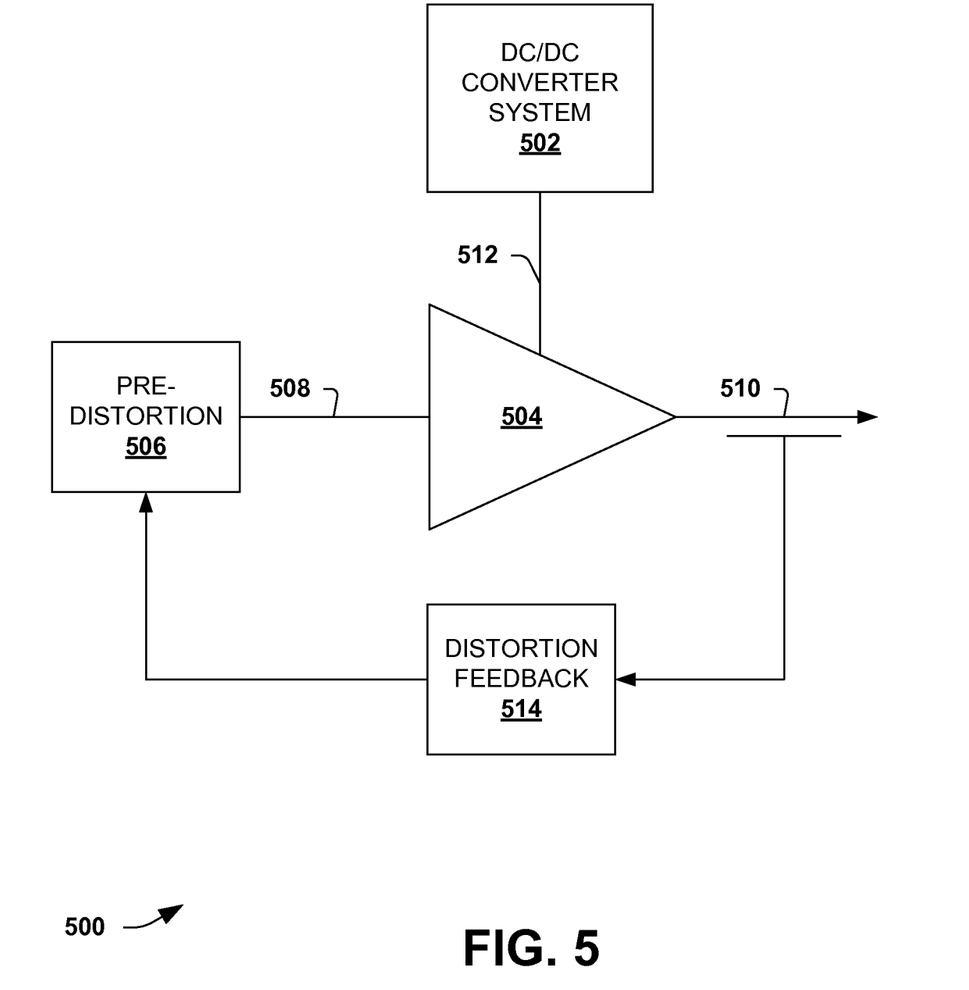
FIG. 5 is a diagram illustrating a transceiver chain using a DC/DC converter to supply power to a driver.

FIG. 5 is a diagram illustrating a transceiver 500 using a DC/DC converter to supply power to a driver. The transceiver 500 is provided as an example and it is appreciated that other components can be incorporated into the transceiver 500. For example, feedback loops, oscillators, and the like can be present but are not shown in this example.

Generally, the transceiver 500 receives an input signal and generates an output signal 510 from the input signal. The output signal 510, in one example, is then transmitted via an antenna or otherwise sent for communication purposes. The chain 500 includes a pre-distortion component 506, a power amplifier 504, a distortion feedback component 514 and a DC/DC converter system 502.

The distortion feedback component 514 measures the output signal 510 and provides the measurements as a distortion feedback signal to the pre-distortion component 506. The distortion feedback component 514 measures or identifies distortion present in the output signal 508.

The pre-distortion component 506 adds distortion, referred to as a pre-distortion, to an input signal 508 based on the distortion feedback signal. The pre-distortion component 506 can utilize envelope tracking or other noise removal/mitigation techniques. The pre-distortion at least partially cancels distortion introduced along the transceiver chain 500. In one example, the input signal 508 is a phase modulated signal.

The power amplifier 504 amplifies the input signal 508 to generate the output signal 510 according to a supply signal 512. In one example, the supply signal is an amplitude modulated signal. As a result, the output signal 508 is provide with polar modulation due to the phase modulated input signal 508 and the amplitude modulated supply signal 512.

Linearity and accuracy of the power amplifier 504 is required to generate a suitable output signal. The power amplifier 504 is sensitive to noise and variations, particularly in its supply signal 512.

The DC/DC converter system 502 generates that supply signal 512 according to a selected level that varies with time. The DC/DC converter system 502 uses adjustments to reduce mismatch(es) between phases of the converter and mitigate generation of spurs. The adjustments include, for example, supply voltage adjustment, inductor adjustment, switching frequency adjustment, pulse width adjustment, cross over timing adjustment, and the like. The adjustments are for one or more of the phases and are typically specific to a phase. As a result, the supply signal 512 is substantially stable.

The converters/systems 100, 104, 200 and/or variations thereof can be used as the converter system 502. The DC/DC converter system 502 can include components, such as a control unit, a measure unit, and the like.

The stability of the supply signal 512 facilitates operation of the power amplifier 504. Thus, the power amplifier 504 generates the output signal 510 with enhanced linearity. Furthermore, as a result of the enhanced operation of the power amplifier 504, the output signal 510 is generated with less noise and enhanced accuracy.

Figure 6:
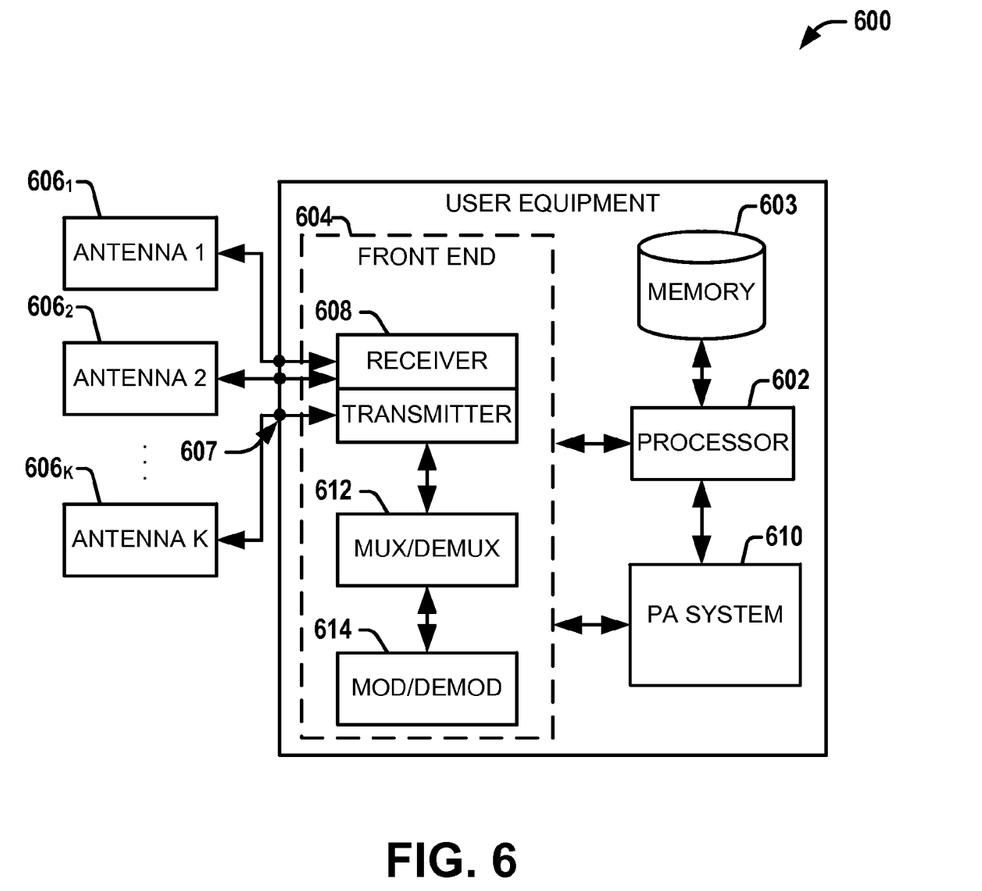
FIG. 6 is a diagram illustrating an exemplary user equipment or mobile communication device.

FIG. 6 is a diagram illustrating an exemplary user equipment or mobile communication device 600 that can be utilized with one or more aspects, as described above.

The mobile communication device 600, for example, comprises a digital baseband processor 602 that can be coupled to a data store or memory 603, a front end 604 (e.g., an RF front end, an acoustic front end, or the other like front end) and a plurality of antenna ports 607 for connecting to a plurality of antennas $606_1$ to $606_k$ (k being a positive integer). The antennas $606_1$ to $606_k$ can receive and transmit signals to and from one or more wireless devices such as access points, access terminals, wireless ports, routers and so forth, which can operate within a radio access network or other communication network generated via a network device. The user equipment 600 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 604 can include a communication platform, which comprises electronic components and associated circuitry that provide for processing, manipulation or shaping of the received or transmitted signals via one or more receivers or transmitters 608, a mux/demux component 612, and a mod/demod component 614.

Amplifiers within the one or more transmitters 608 can be configured to use a DC/DC converter or converter system, such as the system 100, converter 200 and/o variations thereof.

The front end 604, for example, is coupled to the digital baseband processor 602 and the set of antenna ports 607, in which the set of antennas $606_1$ to $606_k$ can be part of the front end. In one example, the mobile communication device 600 can include a PA system 610 that operates with a delay component for providing a delay between a main signal processing path and an envelope tracking path of a PA. The PA 610 can include a DC/DC converter or converter system, such as the system 100, converter 200 and/or variations thereof.

The user equipment device 600 can also include a processor 602 or a controller that can operate to provide or control one or more components of the mobile device 600. For example, the processor 602 can confer functionality, at least in part, to substantially any electronic component within the mobile communication device 600, in accordance with aspects of the disclosure.

The processor 602 can operate to enable the mobile communication device 600 to process data (e.g., symbols, bits, or chips) for multiplexing/demultiplexing with the mux/demux component 612, or modulation/demodulation via the mod/demod component 614, such as implementing direct and inverse fast Fourier transforms, selection of modulation rates, selection of data packet formats, inter-packet times, etc. Memory 603 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 602 is functionally and/or communicatively coupled (e.g., through a memory bus) to memory 603 in order to store or retrieve information necessary to operate and confer functionality, at least in part, to communication platform or front end 604, the PA system 610 and substantially any other operational aspects of the PA system 610.

Figure 7:
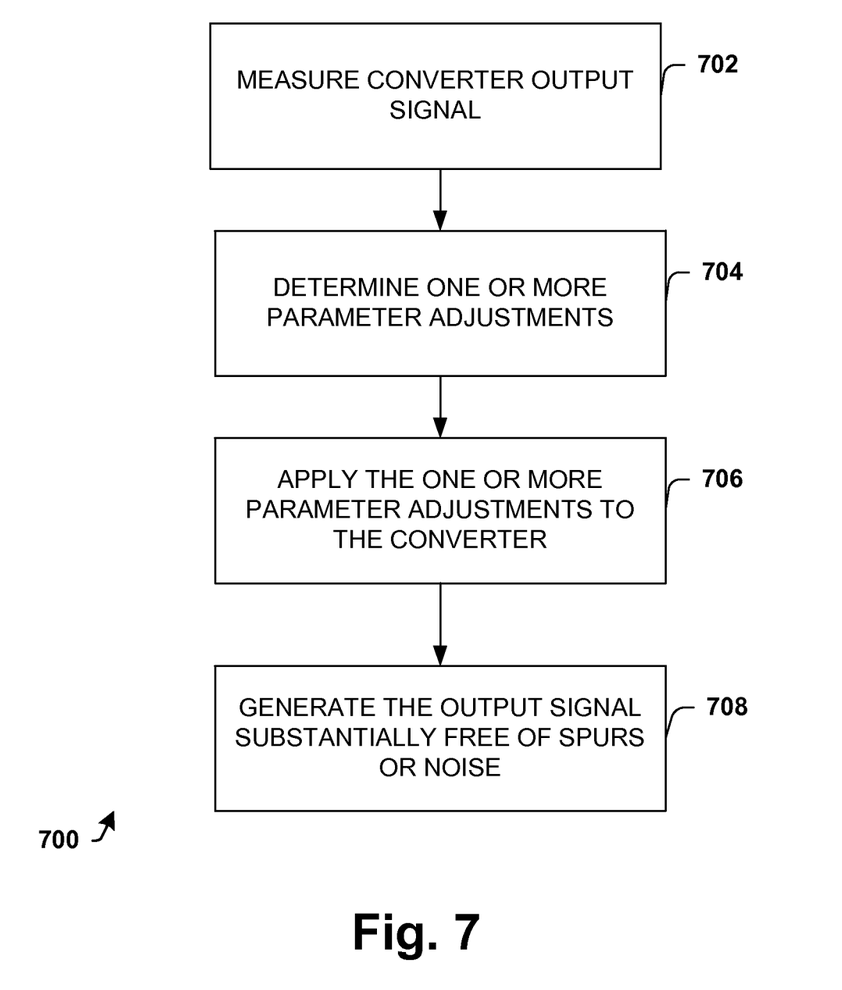
FIG. 7 is a flow diagram illustrating a method of operating a DC/DC converter.

FIG. 7 is a flow diagram illustrating a method 700 of operating a DC/DC converter. The method 700 measures an output signal to identify generated spurs and applies parameter adjustments to mitigate mismatches and the generated spurs.

A DC/DC converter output signal is measured at block 702. The signal is directly measured and can be used to identify or determine mismatch characteristics. The output signal indicates the mismatch characteristics, for example, by generated unwanted noise, such as spurs. A measure unit or similar component can be used to measure the output signal. Alternatively, the converter output signal is indirectly measured, such as when the converter output signal is connected to an RF power amplifier, measured using a receiver chain and the like.

A control unit determines one or more parameter adjustments from the measured mismatch characteristics at block 704. The one or more parameter adjustments are determined that will mitigate or reduce generated spurs and/or mismatches in the converter. In one example, the control unit correlates a measured spur with an inductor adjustment. In another example, the control unit correlates a measured spur with a driver supply adjustment.

A multiphase DC/DC converter applies the one or more parameter adjustments at block 706. The converter includes one or more adjustable elements or parameters, such as adjustable inductors, adjustable supply voltages, and the like as shown above with the converter 200. The parameter adjustments are applied to the adjustable parameters, which results in mitigating mismatch between phases and generation of noise, such as spurs.

The multiphase DC/DC converter generates the output signal at block 708 having mitigated spurs and/or other noise. The generation of spurs in the output signal is mitigated as a result of the adjusted parameters.

As a result, the method 700 provides a DC output signal that is substantially free of generated spurs by compensating for mismatches within phases of the multiphase DC/DC converter.

The method 700 can be performed during production in order to set the adjustable parameters with values that remain fixed. Alternatively, the method 700 is performed on a repetitive basis, even during use. By so doing, variations, including PVT variations, that impact the phases over time can be accommodated or compensated for.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a voltage converter system having a control unit, a multiphase converter, and a measure unit. The control unit is configured to generate one or more converter parameter adjustments from a feedback signal. The multiphase converter is configured to selectively generate an output signal at a selected voltage and to adjust one or more converter parameters using the one or more converter parameter adjustments to mitigate generation of spurs in the output signal. The measuring unit is configured to measure the output signal and generate the feedback signal from the output signal.

Example 2 includes the subject matter of claim 1, where the one or more converter parameter adjustments include one or more inductor adjustments.

Example 3 includes the subject matter of any of claims 1-2, including or omitting optional elements, where the one or more converter parameter adjustments include one or more driver supply voltage adjustments.

Example 4 includes the subject matter of any of claims 1-3, including or omitting optional elements, where each phase of the multiphase converter includes an adjustable inductor as the one or more converter parameters.

Example 5 includes the subject matter of any of claims 1-4, including or omitting optional elements, where each phase of the multiphase converter includes an adjustable supply voltage as the one or more converter parameters.

Example 6 includes the subject matter of any of claims 1-5, including or omitting optional elements, where each phase of the multiphase converter includes a pulse width modulation component as the one or more converter parameters.

Example 7 includes the subject matter of any of claims 1-6, including or omitting optional elements, where each phase of the multiphase converter includes a timing shift component as the one or more converter parameters.

Example 8 includes the subject matter of any of claims 1-7, including or omitting optional elements, where the one or more converter parameters include an adjustable inductor, an adjustable phase driver supply voltage, and an adjustable phase delay.

Example 9 includes the subject matter of any of claims 1-8, including or omitting optional elements, where the control unit is configured to analyze the feedback signal to identify the one or more converter parameters.

Example 10 includes the subject matter of any of claims 1-9, including or omitting optional elements, where the measuring unit measures one or more mismatches of the output signal and provides the one or more mismatches as the feedback signal.

Example 11 includes the subject matter of any of claims 1-10, including or omitting optional elements, where the measuring unit is configured to measure the output signal indirectly using an RF receiver.

Example 12 is a DC/DC converter having a clock generator, a plurality of configurable delay elements, a plurality of pulse width modulation components, a plurality of drivers and a plurality of inductors. The clock generator is configured to generate a plurality of clock signals. The plurality of configurable delay elements are configured to adjust the plurality of clock signals. The plurality of pulse width modulation components are configured to generate a plurality of modulated signals from an input signal according to the plurality of clock signals. The plurality of drivers are configured to generate a plurality of driver output signals from the modulated signals using a plurality of configurable driver supply voltages. The plurality of adjustable inductors are configured to generate a plurality of phase output signals from the plurality of driver output signals.

Example 13 includes the subject matter of claim 12, including or omitting optional elements, where the plurality of adjustable inductors are configured to have a plurality of inductance values according to a parameter adjustment signal from a control unit.

Example 14 includes the subject matter of any of claims 12-13, including or omitting optional elements, where the plurality of pulse width modulation components are configured to adjust a pulse width of the plurality of modulated signals to mitigate spur generation.

Example 15 includes the subject matter of any of claims 12-14, including or omitting optional elements, further including an output node for combining the plurality of phase output signals into a converter output signal.

Example 16 is a method of operating a DC/DC converter. A plurality of mismatch characteristics are measured. A control unit determines one or more parameter adjustments from the plurality of measured mismatch characteristics. The one or more parameter adjustments are applied to a multiphase converter. An output signal is generated having mitigated spurs based on the one or more parameter adjustments.

Example 17 includes the subject matter claim 16, including or omitting optional elements, further including adjusting an adjustable inductor of the multiphase converter.

Example 18 includes the subject matter of any of claims 16-17, including or omitting optional elements, further including adjusting an adjustable driver supply voltage of the multiphase converter.

Example 19 includes the subject matter of any of claims 16-17, including or omitting optional elements, further including adjusting a pulse width of pulse width modulated signals of the multiphase converter.

Example 20 includes the subject matter of any of claims 16-19, including or omitting optional elements, further including supplying the output signal as a supply voltage to a modulation driver.

Example 21 is a system for a DC/DC converter. The system includes a means for measuring mismatch characteristics. The system includes a means for determining one or more parameter adjustments from the measured mismatch characteristics. The system includes a means for applying the one or more parameter adjustments to a multiphase converter. The system also includes a means for generating an output signal having mitigated spurs due to the one or more parameter adjustments.

Example 22 includes the subject matter of claim 22, including or omitting optional elements, further including a means for adjusting an adjustable inductor of the multiphase converter.

Example 23 includes the subject matter of any of claims 22-23, including or omitting optional elements, further including a means for supplying the output signal as a supply voltage.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The component or structure includes a processor executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A voltage converter system comprising:
   a control unit configured to generate one or more converter parameter adjustments from a feedback signal;
   a multiphase converter configured to selectively generate an output signal at a selected voltage and to adjust one or more converter parameters using the one or more converter parameter adjustments to mitigate generation of spurs in the output signal;
   wherein the output signal comprises a regulated signal portion and an AC error signal portion; and
   a measuring unit configured to measure the output signal and generate the feedback signal from the AC error signal portion within the output signal.

2. The system of claim 1, wherein the one or more converter parameter adjustments generated by the control unit include inductor adjustments; and
   wherein each phase of the multiphase converter includes an adjustable inductor modified by one or more of the converter parameters.

3. The system of claim 1, wherein the one or more converter parameter adjustments generated by the control unit include one or more driver supply voltage adjustments; and
   wherein each phase of the multiphase converter includes an adjustable supply voltage modified by one or more of the converter parameters.

4. The system of claim 1, wherein each phase of the multiphase converter includes a pulse width modulation component as the one or more converter parameters.

5. The system of claim 1, wherein each phase of the multiphase converter includes a timing shift component as the one or more converter parameters.

6. The system of claim 1, wherein the one or more converter parameters include an adjustable inductor, an adjustable phase driver supply voltage, and an adjustable phase delay.

7. The system of claim 1, wherein the control unit is configured to analyze the feedback signal to identify the one or more converter parameters.

8. The system of claim 1, wherein the measuring unit is configured to measure one or more mismatches of the output signal and output the one or more mismatches as the feedback signal.

9. The system of claim 1, wherein the measuring unit is configured to measure the output signal indirectly using an RF receiver.

10. A DC/DC converter comprising:
    a clock generator configured to generate a plurality of clock signals;
    a plurality of configurable delay elements configured to adjust the plurality of clock signals;
    a plurality of pulse width modulation components configured to generate a plurality of modulated signals from an input signal according to the plurality of clock signals;
    a plurality of drivers configured to generate a plurality of driver output signals from the plurality of modulated signals using a plurality of configurable driver supply voltages; and
    a plurality of adjustable inductors configured to generate a plurality of phase output signals from the plurality of driver output signals.

11. The converter of claim 10, wherein the plurality of adjustable inductors are configured to have a plurality of inductance values according to a parameter adjustment signal from a control unit.

12. The converter of claim 10, wherein the plurality of pulse width modulation components are configured to adjust a pulse width of the plurality of modulated signals to mitigate spur generation.

13. The converter of claim 10, further comprising an output node for combining the plurality of phase output signals into a converter output signal.

14. A method of operating a DC/DC converter, the method comprising:
    measuring a plurality of mismatch characteristics from an AC error signal portion in an output signal of the DC/DC converter, wherein the output signal comprises a regulated signal portion and the AC error signal portion;
    determining one or more parameter adjustments from the plurality of measured mismatch characteristics by a control unit;
    applying the one or more parameter adjustments to a multiphase converter; and
    generating an output signal having mitigated spurs based on the one or more parameter adjustments.

15. The method of claim 14, further comprising adjusting an adjustable inductor of the multiphase converter.

16. The method of claim 14, further comprising adjusting an adjustable driver supply voltage of the multiphase converter.

17. The method of claim 14, further comprising adjusting a pulse width of pulse width modulated signals of the multiphase converter.

18. The method of claim 14, further comprising supplying the output signal as a supply voltage to a modulation driver.

* * * * *